No. 839,507. PATENTED DEC. 25, 1906.
O. N. PETERSON & H. M. SATHER.
WAGON ATTACHMENT.
APPLICATION FILED AUG. 1, 1906.

WITNESSES
A. M. Walstrom
J. H. Baldwin

INVENTORS
OLE N. PETERSON
HALVOR M. SATHER
BY Paul Paul
THEIR ATTORNEYS

UNITED STATES PATENT OFFICE.

OLE N. PETERSON AND HALVOR M. SATHER, OF CANBY, MINNESOTA.

WAGON ATTACHMENT.

No. 839,507.  Specification of Letters Patent.  Patented Dec. 25, 1906.

Application filed August 1, 1906. Serial No. 328,709.

*To all whom it may concern:*

Be it known that we, OLE N. PETERSON and HALVOR M. SATHER, of Canby, Yellow Medicine county, Minnesota, have invented certain new and useful Improvements in Wagon Attachments, of which the following is a specification.

The object of our invention is to provide a simple expeditious means for securing the hay-rack of a wagon-box to a running-gear.

Our invention consists generally in various constructions and combinations, all as hereinafter described, and particularly pointed out in the claims.

Figure 1:
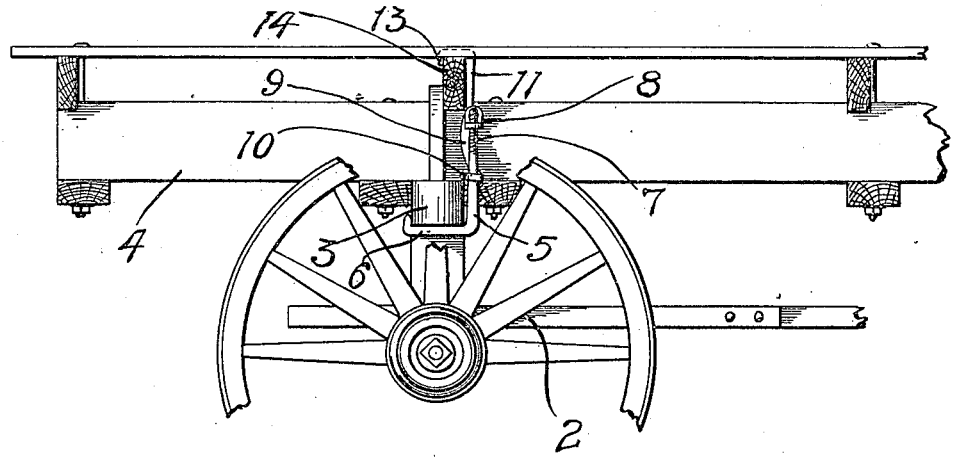
Figures 2, 3, 4:
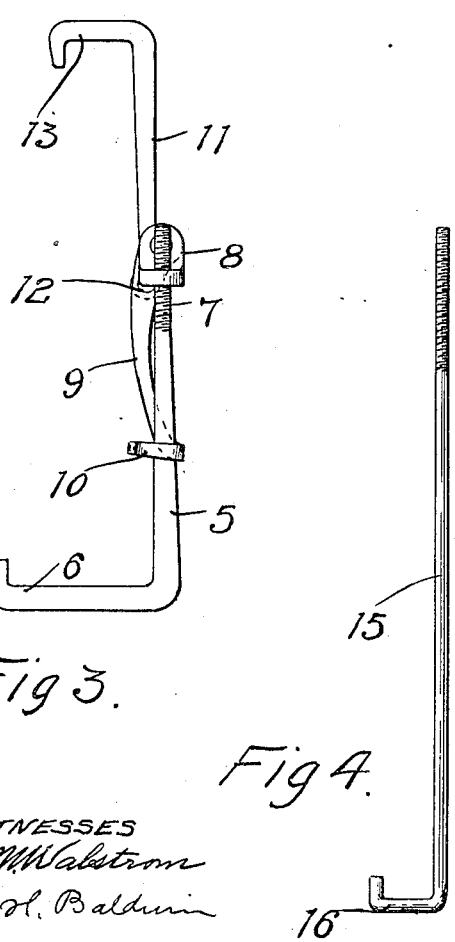

In the accompanying drawings, forming part of this specification, Figure 1 is a side elevation of a portion of a wagon running-gear showing the means for securing a hay-rack thereon. Fig. 2 is a detail view illustrating the clamp in its open or unlocked position. Fig. 3 is a similar view of the clamp in its locked position. Fig. 4 is a modification in one member of the clamp to adapt the device particularly for a wagon-body.

In the drawings, 2 represents a wagon running-gear having a bolster 3 whereon the rack 4 is placed.

5 is a hook having a wide jaw 6 and a threaded end 7 whereon a bracket 8 is adjustably mounted. The hook 6 is adapted to be slipped in under the bolster and has a turned-up end to prevent its accidental dislodgment therefrom.

9 is a lever pivoted on the bracket 8 and having a loop 10 at one end to engage the shank of the hook when the device is in its locked position.

11 is a rod pivoted at 12 on the lever 9 and having a hook 13 at its upper end to engage a cross-bar 14 on the rack, the bracket 8 being adjusted to allow the hook 13 to be slipped over the bar 14 and the hook 6 to be inserted under the bolster. After the hooks have been properly adjusted the operator will grasp the lever 9 and swing it down to a vertical position, whereupon the pivot 12 will pass beyond the pivotal connection of the lever 9 with the bracket 8, as indicated in Fig. 3, and the lever will be locked until such time as the pivotal connection of the rod 11 with the lever is swung to the other side of the bracket. Adjustment is permitted of the parts to allow their proper separation to adapt them for racks of different depths.

In Fig. 4 a slight modification is shown, which consists in providing a rod 15, having a hook 16 at its lower end to engage the cross-bar of a wagon-box, while the hook at the upper end of the rod 11 may be used to engage the side-boards on said box for the purpose of holding them in place thereon. This rod 15 also has a threaded upper end to allow adjustment of the bracket and the lever and hook carried thereby.

We claim as our invention—

1. The combination, with a running-gear, of a rod having a hook at its lower end adapted to engage the under side of the bolster, and a threaded upper end, a bracket adjustably mounted on said threaded upper end, a lever pivoted on said bracket and adapted to be swung to a vertical position parallel with said rod and a rod pivoted on said lever between its free end and its pivot on said bracket and having a hooked upper end to engage the top of a rack cross-bar, substantially as described.

2. The combination, with a running-gear having a bolster, of a hay-rack resting thereon, a rod having a hook at its lower end, said hook comprising a straight portion with an upwardly-turned point and adapted to engage the under side bolster and said rod having a threaded upper end, a bracket adjustably mounted on said threaded end, a lever pivoted at one end on said bracket and having a loop to engage said rod when said lever is swung down to a vertical position, and a second rod pivotally connected to said lever near its pivotal connection on said bracket and having a hook at its upper end comprising a straight portion and a downwardly-turned point and adapted to engage the rack cross-bar, whereby when said lever is swung down against said first-named rod, said rack and bolster will be locked securely together, substantially as described.

In witness whereof we have hereunto set our hands this 27th day of July, 1906.

OLE N. PETERSON.
HALVOR M. SATHER.

Witnesses:
A. R. BUTTKE,
J. R. STEELE.